United States Patent [19]
Reibold

[11] 3,782,368
[45] Jan. 1, 1974

[54] TRANSDUCER CONSTRUCTION AND SYSTEM FOR MEASURING RESPIRATION

[75] Inventor: Robert C. Reibold, Garden Grove, Calif.

[73] Assignee: McDonnell Douglas Corporation, Santa Monica, Calif.

[22] Filed: May 24, 1971

[21] Appl. No.: 146,156

[52] U.S. Cl. .............................. 128/2.08, 128/2 S
[51] Int. Cl. ............................................. A61b 5/08
[58] Field of Search ............... 128/2 R, 2 S, 2.05 E, 128/2.05 P, 2.05 R, 2.05 Q, 2.06 B, 2.06 F, 2.06 G, 2.06 R, 2.08; 73/379; 307/264, 237; 328/168–173; 330/16, 19

[56] References Cited
UNITED STATES PATENTS

| | | | |
|---|---|---|---|
| 3,154,067 | 10/1964 | Stenstrom et al. | 128/2.05 P |
| 3,127,768 | 3/1964 | Burch et al. | 128/2.06 R |
| 3,498,288 | 3/1970 | Max et al. | 128/2.06 B |
| 3,621,284 | 11/1971 | Cluett et al. | 307/264 |
| 3,483,861 | 12/1969 | Tiep | 128/2.08 |
| 3,520,294 | 7/1970 | Fuzzell et al. | 128/2 S |

*Primary Examiner*—William E. Kamm
*Attorney*—Walter J. Jason, Donald L. Royer and D. N. Jeu

[57] ABSTRACT

A moment-actuated transducer unit mounted to an elastic belt having Velcro-type fastener means for attaching the belt and transducer unit snugly around the chest or abdomen region of a subject's body provides a highly sensitive and easily installed respiration transducer assembly. The output of the transducer unit can be connected directly to a high input impedance recorder or to a signal conditioning circuit which includes an unfiltered output and a high frequency filtered output wherein a regular high input impedance recorder can be selectively connected to either of such outputs.

7 Claims, 12 Drawing Figures

PATENTED JAN 1 1974　3,782,368
SHEET 1 OF 2
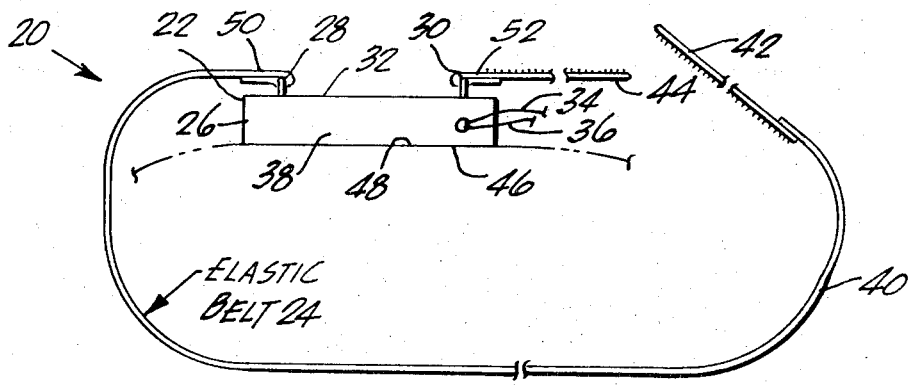
Fig. 1
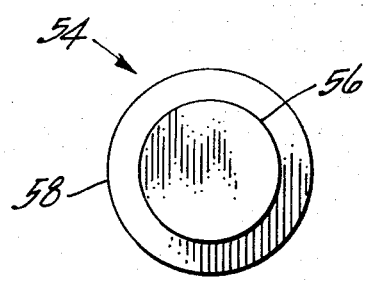
Fig. 2
Fig. 3
Fig. 4
Fig. 5
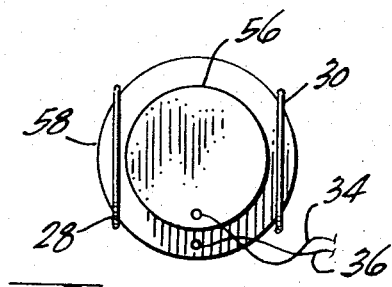
Fig. 6
Fig. 7
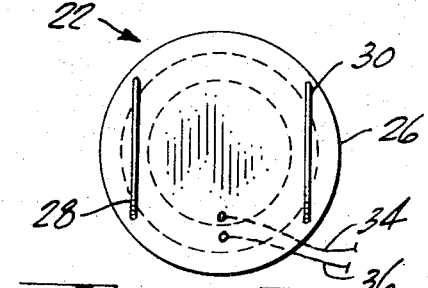
Fig. 8
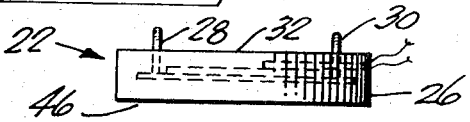
Fig. 9
INVENTOR.
ROBERT C. REIBOLD
BY
Dock N. Jen
- AGENT -

TRANSDUCER CONSTRUCTION AND SYSTEM FOR MEASURING RESPIRATION

BACKGROUND OF THE INVENTION

My present invention relates generally to physiological measuring apparatus and, more particularly, to a means for obtaining accurate respiration data from human or other animal subjects either at rest or during intense activity thereof with negligible interference of their normal functions.

In the measurement of respiration data, a thermistor face mask which encloses the nose and mouth areas of the subject is commonly used to measure the confined air temperature and its variation in order to determine respiration rate and volume. The thermistor mask is, however, encumbering to the wearer and relatively complex conditioning of the thermistor output signal is required to provide a useful signal which can be applied directly to an ordinary recorder. Of course, a face mask cannot be used on animals without greatly interfering with their normal activities.

Strain gage type transducers for sensing stress changes due to expansion or contraction of the skin area to which they are affixed have been employed to avoid the use of face masks. Such transducers are, however, cumbersome because of their (beam) size and they must normally be used in a bridge circuit. Further, the strain type transducer is relatively insensitive and also requires relatively complex signal conditioning before its output signal can be usefully applied to a regular recorder.

An impedance pneumograph can be utilized to avoid the use of face masks. The pneumograph essentially measures the movements of the chest wall during respiration as changes in impedance between attached chest electrodes. It is, however, more troublesome to use because of the requirement for good electrical contacts with a subject's body. As in the preceding devices, it also requires relatively complex signal conditioning of its output signal before it can be feasibly applied to an ordinary recorder.

SUMMARY OF THE INVENTION

Briefly, and in general terms, my invention is preferably accomplished by providing a highly sensitive and easily installed respiration transducer assembly including a moment-actuated transducer unit mounted to an elastic belt having Velcro-type fastener means for attaching the belt and transducer unit snugly around the chest or abdomen portion of a subject's body, the output of the transducer unit being connectable directly to a high input impedance recorder or indirectly to a low input impedance recorder through a signal conditioning circuit (wherein such recorder is connected to the unfiltered output thereof).

The transducer unit comprises a piezoelectric element including a thin piezoelectric crystal cemented to the front face of a thin metallic (beam) disc, a pair of parallel attachment (bending arm) loops affixed rigidly to the rear face of the metallic disc and protruding perpendicularly a predetermined distance before the front face thereof, a pair of electrical leads soldered respectively to the piezoelectric crystal and metallic disc, and a layer of resilient material encapsulating the piezoelectric element and inner portions of the attachment loops and electrical leads adjacent to the piezoelectric element. The elastic belt is connected to the exposed portions of the attachment loops and is used to support the transducer unit.

The signal conditioning circuit comprises an attenuator having an unfiltered output and a filtered output including a low pass filter having a cut-off frequency of about 0.2 hertz to reject higher frequency signals than the respiration signals, such as those caused by motion or vibration of the transducer unit when the subject is running. The conditioning circuit presents a high input impedance to the transducer unit and a low output impedance to a recorder or the low pass filter. A high or low input impedance recorder can be connected to the unfiltered output; however, a sufficiently high input impedance recorder which does not load the low pass filter should ordinarily be connected to the filtered output. The capacitance of the transducer unit and the shunting input impedance (resistance) of the conditioning circuit provides a relatively long time constant which permits the system to be self-balancing.

BRIEF DESCRIPTION OF THE DRAWINGS

My invention will be more fully understood, and other features and advantages thereof will become apparent, from the description given below of an exemplary embodiment of the invention. This description of the exemplary embodiment of the invention is to be taken in conjunction with the accompanying drawings, in which:

FIG. 1 is a top plan view of a transducer assembly constructed in accordance with this invention and shown in position to be fastened about the lower chest or diaphragm area of a person's body;

FIG. 2 is a front elevational view of a piezoelectric element used in the construction of a transducer unit which is a component of the transducer assembly shown in FIG. 1;

FIG. 3 is a top plan view of the piezoelectric element shown in FIG. 2;

FIG. 4 is a side elevational view of an attachment loop used in the construction of the transducer unit component;

FIG. 5 is a top plan view of the attachment loop shown in FIG. 4;

FIG. 6 is a front elevational view of the transducer unit component prior to encapsulation thereof;

FIG. 7 is a top plan view of the unencapsulated transducer unit component shown in FIG. 6;

FIG. 8 is a front elevational view of the transducer unit component used in the transducer assembly of FIG. 1;

FIG. 9 is a top plan view of the transducer unit component shown in FIG. 8;

DESCRIPTION OF THE PRESENT EMBODIMENT

Figure 10:
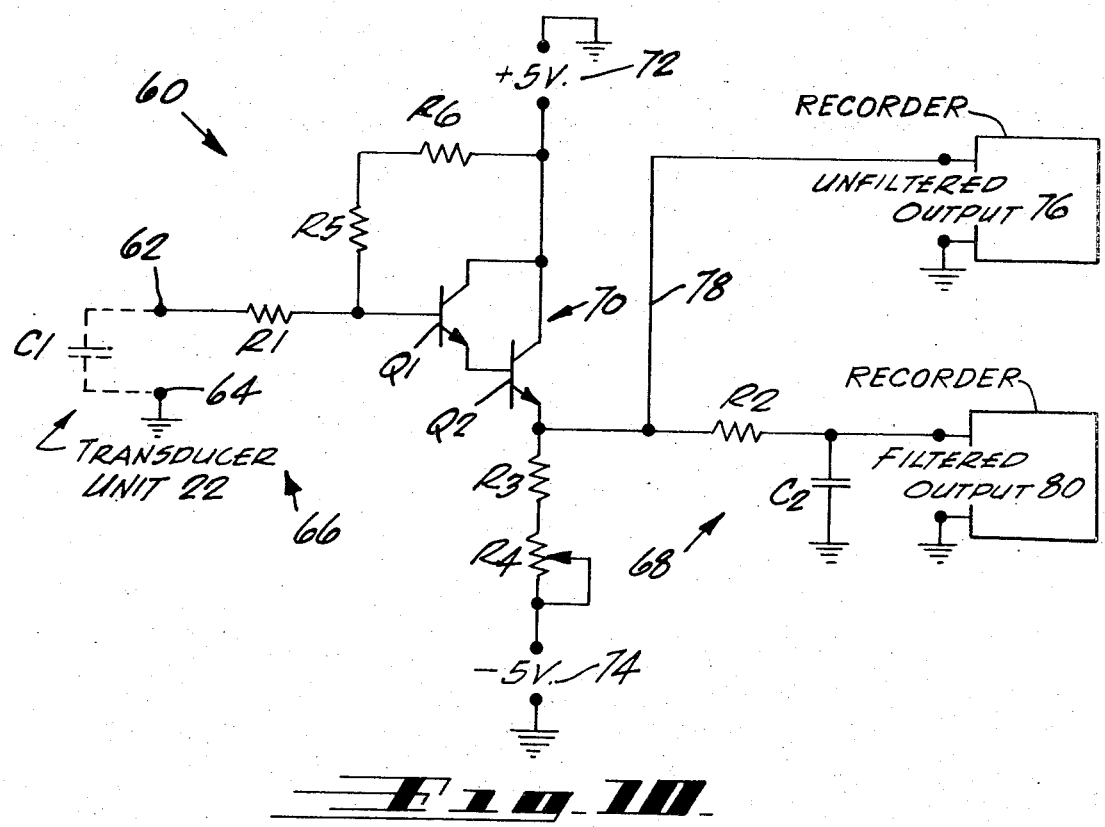
FIG. 10 is a circuit diagram of a signal conditioning circuit which is preferably used with the transducer assembly of FIG. 1.

In the following description of an exemplary embodiment of my invention, some specific component values, dimensions and types of materials are disclosed. It is to be understood that such component values, dimensions and types of materials are, however, given as examples only and are not intended to limit the scope of this invention in any manner.

FIG. 1 is a top plan view of a transducer assembly 20 including a transducer unit 22 and its fastener belt 24. In this illustrative embodiment, the transducer unit 22 is preferably a small circular disc 26 having two attachment loops 28 and 30 protruding perpendicularly from the front face 32 thereof. Two electrical leads 34 and 36 extend from the circumferential side surface 38 of the disc 26. The belt 24 can be fabricated from common elastic waistband material 40 and Velcro fastening sections 42 and 44. The elastic material 40 is, for example, approximately three-fourth inch wide and suitably thin and long enough to secure the transducer unit 22 snugly about the lower chest of a person's body when the sections 42 and 44 are properly fastened together. The rear face 46 of the transducer unit 22 is, of course, preferably positioned against the diaphragm area 48 of the person's body.

The end portions 50 and 52 of belt 24 are respectively looped through the attachment loops 28 and 30 and sewn together as shown. The Velcro fastening sections 42 and 44 are each, for example, approximately three-fourths inch wide and about 8 inches long having the usual fastening layer of tiny plastic hooks or barbs on one surface. The section 42 can be sewn to the right end of the elastic material 40. The use of Velcro fastening sections 42 and 44 is highly preferred because such sections permit ready and adjustable-length fastening of the belt 24 about the thorax (near the diaphragm) of an animal and, yet, do not allow an excessively tight connection of the belt which would restrict or hamper normal expansion and contraction of such thorax region.

FIGS. 2 through 9 are various views of the transducer unit 22 and different parts thereof, showing an exemplary construction of the unit. A front elevational view of a piezoelectric element 54 is shown in FIG. 2, and a top plan view thereof is shown in FIG. 3. The element 54 includes a thin piezoelectric crystal 56 cemented to the front face of a thin metallic (brass beam) disc 58. The crystal 56 can be a disc approximately 1 inch in diameter and 0.020 inch thick, and the metallic disc 58 can be approximately 1⅜ inches in diameter and 0.020 inch thick. The piezoelectric element 54 can be, for example, a Clevite P/N 60690 "Unimorph" element which is commercially available for direct use in the transducer unit 22.

A side elevational view of the attachment loop 28 (FIG. 1) by itself is shown in FIG. 4, and a top plan view thereof is shown in FIG. 5. The loop 28 is, of course, substantially identical to loop 30 and can be seen to be a generally oval ring which can be made of 0.040 inch diameter, hard drawn brass wire, for example. The loop 28 can have approximately 1 inch length and ⅜ inch width outside dimensions. These loops 28 and 30 are suitably attached to the element 54 (FIGS. 2 and 3) to provide attachment connections for respective ends of the belt 24 (FIG. 1) and to serve as bending arms which operate the piezoelectric element 54.

A front elevational view of the element 54 with loops 28 and 30, and leads 34 and 36, attached thereto is shown in FIG. 6, and a top plan view thereof is shown in FIG. 7. The loops 28 and 30 can be rigidly soldered or welded to the rear face of the metallic disc 58. As illustrated, the loops 28 and 30 are affixed so that their planes are positioned parallel to each other and perpendicular to the plane of the disc 58. The ends of the electrical leads 34 and 36 are preferably soldered respectively to the crystal 56 and the disc 58, as shown. After this has been accomplished, the device is encapsulated in a resilient material such as silicone rubber (type RTV 140, for example) in the form of circular disc 26 (FIG. 1).

A front elevational view of the encapsulated device or transducer unit 22 is shown in FIG. 8, and a top plan view thereof is shown in FIG. 9. The rubber disc 26 can be approximately 1¾ inches in diameter and ⅜ inch thick, and the loops 28 and 30 can protrude approximately 3/16 inch perpendicularly from the front face 32 of the disc 26, for example. The end portions 50 and 52 (FIG. 1) of the belt 24 are, of course, secured to the loops 28 and 30, respectively. The free ends of the leads 34 and 36 can be connected directly to a high input impedance, strip chart recorder (not shown) for measurement of the respiration of a relatively inactive subject. When the subject is engaged in intense activity, the leads 34 and 36 are preferably connected to the high impedance input of a signal conditioning circuit which includes a low pass output filter having its output connected to a regular high input impedance recorder (not shown). A Beckman type SII Dynograph Recorder has been satisfactorily used.

FIG. 10 is a circuit diagram of a signal conditioning circuit 60 which can be used when a low input impedance recorder is employed or when measuring the respiration (rate and volume) of a subject during intense activity thereof. The circuit 60 is preferably used whether the subject is relatively inactive or engaged in intense activity. The transducer unit 22 is indicated in broken lines as a capacitor C1 connected to input terminals 62 and 64 of the circuit 60. The contiguous disc structures of the crystal 56 and metallic disc 58 (FIGS. 2 and 3) obviously provide a largely capacitive configuration which produces a variable output voltage therefrom according to the mechanical actuation (deflection) thereof. It is noted that a maximum output signal of about 50 volts, for example, can be generated from the piezoelectric element 54 (transducer unit 22) when it is normally operated. Of course, this output signal can be restricted or reduced in magnitude by use of a thicker disc 58 and/or heavier encapsulation of the element 54; however, the response sensitivity of the element is then correspondingly restricted or reduced. The usual recorder only requires and normally operates with an input signal of less than approximately 1 volt.

The signal conditioning circuit 60 essentially includes an attenuator 66 which is used to prevent signal saturation because of the high sensitivity (5 volts per mil deflection) of the piezoelectric element 54, and an output filter 68 which can be used when desired or required to filter the generated signal from the piezoelectric element. The attenuator 66 comprises series resistor R1 and a Darlington impedance buffer stage 70, and the filter 68 comprises series resistor R2 and shunt capacitor C2. The buffer stage 70 includes transistors Q1 and Q2 wherein the base of the former transistor is connected to input terminal 62 by resistor R1 and the emitter is connected to the base of the latter transistor. The collectors of the transistors Q1 and Q2 are connected to a source 72 of positive voltage, and the emitter of the latter transistor is connected through series connected resistor R3 and potentiometer R4 to a source 74 of negative voltage. Series connected resistors R5 and R6 connect the source 72 to the base of the transistor Q1, and bias it and the transistor Q2 to be normally always conducting. The emitter of transistor Q2 is connected to unfiltered output 76 by lead 78, and to filtered output 80 by the R2-C2 filter 68, as shown. Potentiometer or rheostat R4 can be used to adjust the outputs 76 and 80 to zero or, if desired, to a positive or negative reference base.

In an illustrative and satisfactory embodiment of the signal conditioning circuit 60, the transistors Q1 and Q2 are each a 2N3391A transistor, resistors R1, R2, R3, R5 and R6 are respectively 100 megohms, 56 kilohms, 1 kilohm, 22 megohms and 22 megohms in value, potentiometer R4 is 10 kilohms in resistance, and capacitor C2 is 20 microfarads (mfd.) in value, for example. The positive and negative voltage sources 72 and 74 can be 5-volt batteries; however, where adjustment of the reference base need not be to zero, only one 5-volt battery (72, for example) can be used (R4 connected to ground) and a reference base such as at 2.5 volts can be utilized.

In operation, the elastic belt 24 (FIG. 1) is fastened snugly (i.e., at a tactually established predetermined tension); and around the chest or abdomen portion of a subject, and the electrical leads 34 and 36 of the transducer unit 22 are connected to the input terminals 62 and 64 of signal conditioning circuit 60 (FIG. 10). At least one of the outputs 76 or 80 is connected to a suitable recorder as indicated. Potentiometer R4 is then adjusted to produce a zero reference base. Inhalation by the subject expands the belt 24 and applies a moment to the loops 28 and 30 (bending arms) to cause a further central outward deflection of the metallic disc 58 (brass beam). This also further deflects the piezoelectric crystal 56 cemented to the disc 58 and produces a positive output voltage from the outputs 76 and 80. Exhalation, of course, produces the opposite effect and a negative output voltage is produced from the outputs 76 and 80 when the deflection of the disc 58 is less than its initial, reference base, condition.

The attenuator 66 (FIG. 10) of the signal conditioning circuit 60 also presents a high input impedance to the transducer unit 22 and provides a low output impedance which generally matches the input impedance of a low input impedance recorder that can be connected to the unfiltered output 76. Of course, a regular high input impedance recorder can be connected to either the unfiltered output 76 or the filtered output 80. A sufficiently high input impedance recorder (which does not load the resistor R2) should, however, be ordinarily connected to the filtered output 80.

The capacity (C1 of approximately 0.03 mfd.) of the transducer unit 22 shunted by the resistance (approximately 140 megohms) of the resistor R1 plus the input impedance of the buffer stage 70 provides a relatively long R-C time constant of about 5 seconds which permits the system to be self-balancing; i.e., when the transducer unit 22 is deflected from its reference condition, an output voltage is generated therefrom which returns to zero by discharging through the resistor R1 and the buffer stage 70. This time constant can, of course, be varied by minor modification of the circuit components. The time constant should not be too short since the output voltage of the transducer unit 22 then would not follow the higher frequency respiration signal components accurately. On the other hand, an excessively long time constant would not allow any large transient voltage generated by the unit 22 (as from a sharp jolt) to be dissipated or decay with sufficient promptness.

Figure 11:
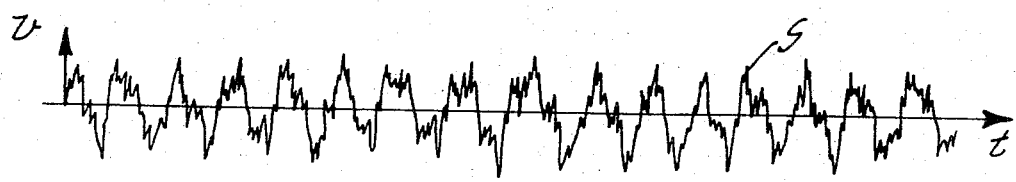
FIG. 11 is a graph showing a curve of a respiration signal recorded by a recorder connected to the unfiltered output of the signal conditioning circuit of FIG. 10.

FIG. 11 is a graph showing a curve S which was the respiration signal obtained from the unfiltered output 76 (output voltage - $v$) and produced by a human subject running at approximately 6 m.p.h. on a treadmill. The respiration rate can be easily determined along the abscissa or time axis (time - $t$) but the variation of respiration volume is somewhat obscured or confused by the superimposed, higher frequency, wavelets which are largely due to the bouncing and vibration of the transducer unit 22 caused by the running motions of the subject. In order to increase the accuracy and ease of determining both respiration rate and volume, the filtered output 80 can be used to drive the recorder.

Figure 12:
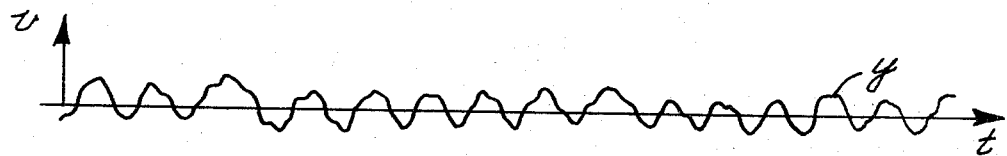
FIG. 12 is another graph showing a curve of a respiration signal recorded by the recorder when connected to the filtered output of the signal conditioning circuit of FIG. 10.

FIG. 12 is a graph, similar to that of FIG. 11, showing a curve $y$ which was the respiration signal obtained from the filtered output 80 and produced by the same running subject. It can be readily seen from an examination of the curves of S and $y$ that both respiration rate and volume can be much more accurately and easily determined from the latter curve. The amplitude of the curve $y$, as measured from its reference base, is substantially devoid of the higher frequency and extraneous wavelets so that it clearly yields a far more accurate indication of instantaneous respiration of volume of the subject. It may be noted that the curves of S and $y$ in FIGS. 11 and 12 are of consecutive signals produced by the same running subject, and are not the unfiltered and filtered forms of an instantaneously identical signal.

The respiration measuring system described above has served to obtain respiration data from human and animal subjects during intense activity thereof or at rest with negligible interference of their normal activity. The system is unencumbering to the subject and has extremely high sensitivity yet is of simple and inexpensive construction. It is self-balancing and particularly easy to install and operate to provide highly accurate and useful respiration data.

The system is capable of detecting and recording pressure changes of heart pulses when the transducer unit 22 is located on or near a surface artery. In determining pulse pressure and rate, for example, the transducer assembly 20 can be installed about the forehead of a person with the transducer unit 22 preferably positioned over a temple region of the person's head. Where the transducer assembly 20 is suitably installed about the chest or abdomen of a person, the pulse rate can actually be noted from inspection of the unfiltered but not the filtered recorded curves of S and $y$ (FIGS. 11 and 12). The pulse pressure signals appear as small prominences superimposed on the large peaks and valleys of the unfiltered respiration curve S for a person not engaged in intense activity, which activity would produce overriding and obscuring signals.

While an exemplary embodiment of this invention has been described above and shown in the accompanying drawings, it is to be understood that such embodiment is merely illustrative of, and not restrictive on, the broad invention and that I do not desire to be limited in my invention to the details of construction or arrangement shown and described, for obvious modifications may occur to persons skilled in the art.

I claim:

1. A transducer assembly comprising:
   a moment-actuated transducer unit including a piezoelectric element having a predetermined capacitance, and a pair of bending arms affixed to and extending substantially perpendicular to said element;
   an elastic belt for supporting said unit, said belt being attached to said arms;
   fastener means for securing said belt at a predetermined tension about a selected portion of a subject's body, said belt applying a moment to said arms according to its instantaneous tension whereby said element is actuated with expansion and contraction of said belt by said body portion to produce a variable electrical output signal from said element representative of the motions of said body portion; and
   a signal conditioning circuit having a high impedance input and a low impedance output, said output signal being applied to said high impedance input and said low impedance output being adapted to be connected to a recorder means, said conditioning circuit including means for adjusting its output reference base level to a predetermined value, and said reference base level adjusting means comprising sources of positive and negative voltages connected to supply said conditioning circuit in opposing polarities, and means connected to one of said sources and adjustable to adjust said reference base level to zero.

2. The invention as defined in claim 1 wherein said recorder means has a high input impedance, and said conditioning circuit further includes a filter means adapted to connect with said recorder means, said filter means comprising a low pass filter having a cut-off frequency of the order of about 0.2 hertz for eliminating the higher frequency and extraneous wavelets from the conditioned output signal applied to said recorder means.

3. A transducer assembly comprising:
   a moment-actuated transducer unit including a piezoelectric element having a predetermined capacitance, and a pair of bending arms affixed to and extending substantially perpendicular to said element, said element comprising a deflectable beam and a piezoelectric crystal bonded to a surface of said beam, and said bending arms being affixed to said beam in a spaced relationship and extending a predetermined distance from said surface;
   an elastic belt for supporting said unit, said belt being attached to said arms;
   fastener means for securing said belt at a predetermined tension about a selected portion of a subject's body, said belt applying a moment to said arms according to its instantaneous tension whereby said element is actuated with expansion and contraction of said belt by said body portion to produce a variable electrical output signal from said element representative of the motions of said body portion, said fastener means including complementary engaging layers of small barbs covering respective end sections of said belt, and said arms including a pair of loops affixed on one side to said beam in a spaced parallel relationship, the other side of said loops extending a predetermined distance freely from said surface and having said belt attached to the free sides of said loops whereby the moment applied to said arms by said belt deflects said beam and its bonded crystal to produce a related output signal from said element; and
   a signal conditioning circuit having a high impedance input and a low impedance output, said output signal being applied to said high impedance input and said low impedance output being adapted to be connected to a recorder means, said conditioning circuit including means for adjusting its output reference base level to a predetermined value and said conditioning circuit having an input impedance which provides in cooperation with said capacitance of said element, a predetermined time constant for regulating decay rate of said output signal.

4. The invention as defined in claim 3 wherein said conditioning circuit includes an attenuator for preventing signal saturation in said recorder means, and said reference base level adjusting means comprises sources of positive and negative voltages connected to supply said conditioning circuit in opposing polarities, and means connected to one of said sources and adjustable to adjust said reference base level to zero.

5. The invention as defined in claim 4 wherein said attenuator comprises a series combination of a resistor of predetermined resistance and a Darlington impedance buffer stage, and said conditioning circuit further includes a filter means adapted to connect said attenuator to said recorder means, said filter means comprising a low pass filter for eliminating the higher frequency and extraneous wavelets from the conditioned output signal applied to said recorder means.

6. A transducer assembly comprising:
   a moment-actuated transducer unit including a piezoelectric element having a predetermined capacitance, and a pair of bending arms affixed to and extending substantially perpendicular to said element;
   an elastic belt for supporting said unit, said belt being attached to said arms;
   fastener means for securing said belt at a predetermined tension about a selected portion of a subject's body, said belt applying a moment to said arms according to its instantaneous tension whereby said element is actuated with expansion and contraction of said belt by said body portion to produce a variable electrical output signal from said element representative of the motions of said body portion; and
   a signal conditioning circuit having a high impedance input and a low impedance output, said output signal being applied to said high impedance input and said low impedance output being adapted to be connected to a recorder means, said conditioning circuit including an attenuator for preventing signal saturation in said recorder means, and said attenuator comprising a series combination of a resistor of predetermined resistance and a Darlington impedance buffer stage.

7. The invention as defined in claim 6 wherein said conditioning circuit has an input impedance which provides in cooperation with said capacitance of said element, a predetermined time constant for regulating decay rate of said output signal.

* * * * *